B. Irving,
Leaching Apparatus.
N° 64,325. Patented Apr. 30, 1867.
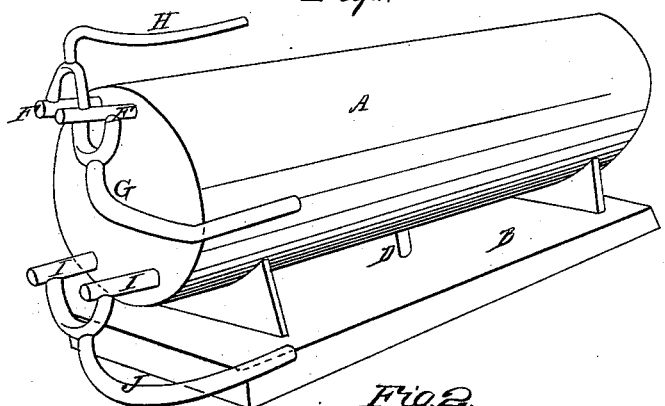
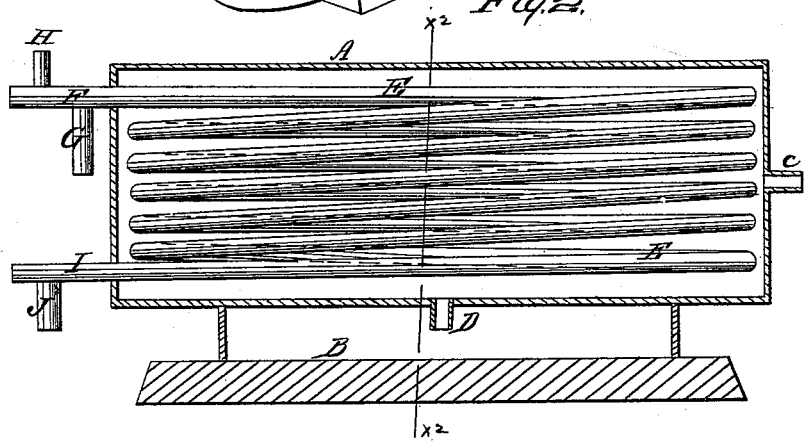
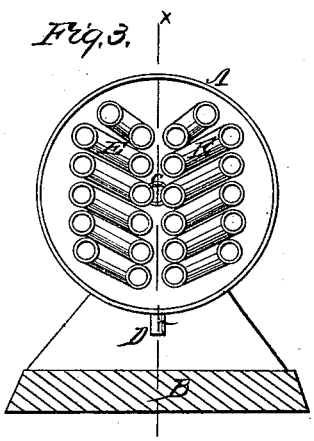
Witnesses: Inventor: Benj'n Irving

United States Patent Office.

BENJAMIN IRVING, OF NEW YORK, N. Y.

Letters Patent No. 64,325, dated April 30, 1867.

---

IMPROVED APPARATUS FOR CONCENTRATING EXTRACTS FROM BARK FOR TANNING.

---

*The Schedule referred to in these Letters Patent and making part of the same.*

---

TO ALL WHOM IT MAY CONCERN:

Be it known that I, BENJAMIN IRVING, of the city, county, and State of New York, have invented a certain new and improved Apparatus for Concentrating the Extract of Bark for Tanning Purposes; and I do hereby declare that the following is a full description of the same.

The nature of my invention consists in combining a worm or coil of cylindrical pipe with a steam-chamber in such a manner as to admit of the continuous flow of the liquid extract through the worm or coil of pipe, and at the same time allow of the escape of the vaporized water from it, in consequence of the heat in the steam-chamber surrounding the worm and acting upon it to concentrate the extract before being discharged from the lower end of the coil of pipe.

It will be obvious that by this arrangement the extract, in passing through the worm, is being evaporated *in vacuo* and therefore the degree of heat in the chamber need never be carried up beyond the boiling point; also, by passing the extract through the worm, but a small portion of it is acted upon at a time, consequently the watery part of the extract is readily vaporized, and being allowed to escape, the concentrated portion of it is fit to be drawn off immediately that it reaches the outlet of the worm, and thus a continuous operation is effected, in contradistinction to the common method of concentrating extracts from barks in vacuum-pans.

But to describe my invention more particularly I will refer to the accompanying drawings, forming a part of this specification, the same letters of reference, wherever they occur, referring to like parts.

Figure 1 is a perspective view of the apparatus.

Figure 2 is a longitudinal cut section of the same through the line $x\,x$, fig. 3.

Figure 3 is a transverse cut section of the same through the line $x^2\,x^2$, fig. 2.

Letter A represents the cylindrical chamber adjusted upon a bed or frame, B, and having an induction-steam pipe, C, in its back end, and a waste or condensed-water pipe, D, in its lower side, about midway between the ends of the chamber. In this chamber are arranged two worms or coils of cylindrical pipes E, running the entire length of the chamber, and nearly filling its interior. The upper ends F of these pipes extend through the head of the steam-chamber, and have attached to them an induction pipe, G, for the admission of the liquid extract, and on their upper sides an exhaust-vapor pipe, H, for the purpose of carrying off the vaporized watery parts of the extract as it is being concentrated in passing through the worm. Letters I are the outlets of the worm, to which is attached an exhaust pipe J, for the purpose of carrying the concentrated extract to any suitable receiver. For the purpose of causing the extract to flow rapidly through the worm, a force-pump or vacuum-chamber will be used in connection with the apparatus, and also a steam-condensing vessel in connection with the steam pipe H, so as to take off the watery vapor as fast as liberated from the extract. By this means it will be obvious that the extract, by the time it reaches the end of the worm or its outlet, will be readily concentrated, and the operation be carried on continuously with all the advantages of the common vacuum-pan used for such purposes, and at the same time much more rapidly, as there would be no lost time in alternately charging, heating up, cooling down, and emptying the apparatus, as is the case with the ordinary vacuum-pan operation.

Having now described my invention, I will proceed to set forth what I claim, and desire to secure by Letters Patent of the United States:

I claim the combination of the worm or coils of cylindrical pipes, made as hereinbefore described, with the steam-chamber, for the purpose of concentrating extracts from barks for tanning purposes.

BENJAMIN IRVING.

Witnesses:
C. L. BARRITT,
J. H. MUNSON.